Patented Feb. 1, 1944

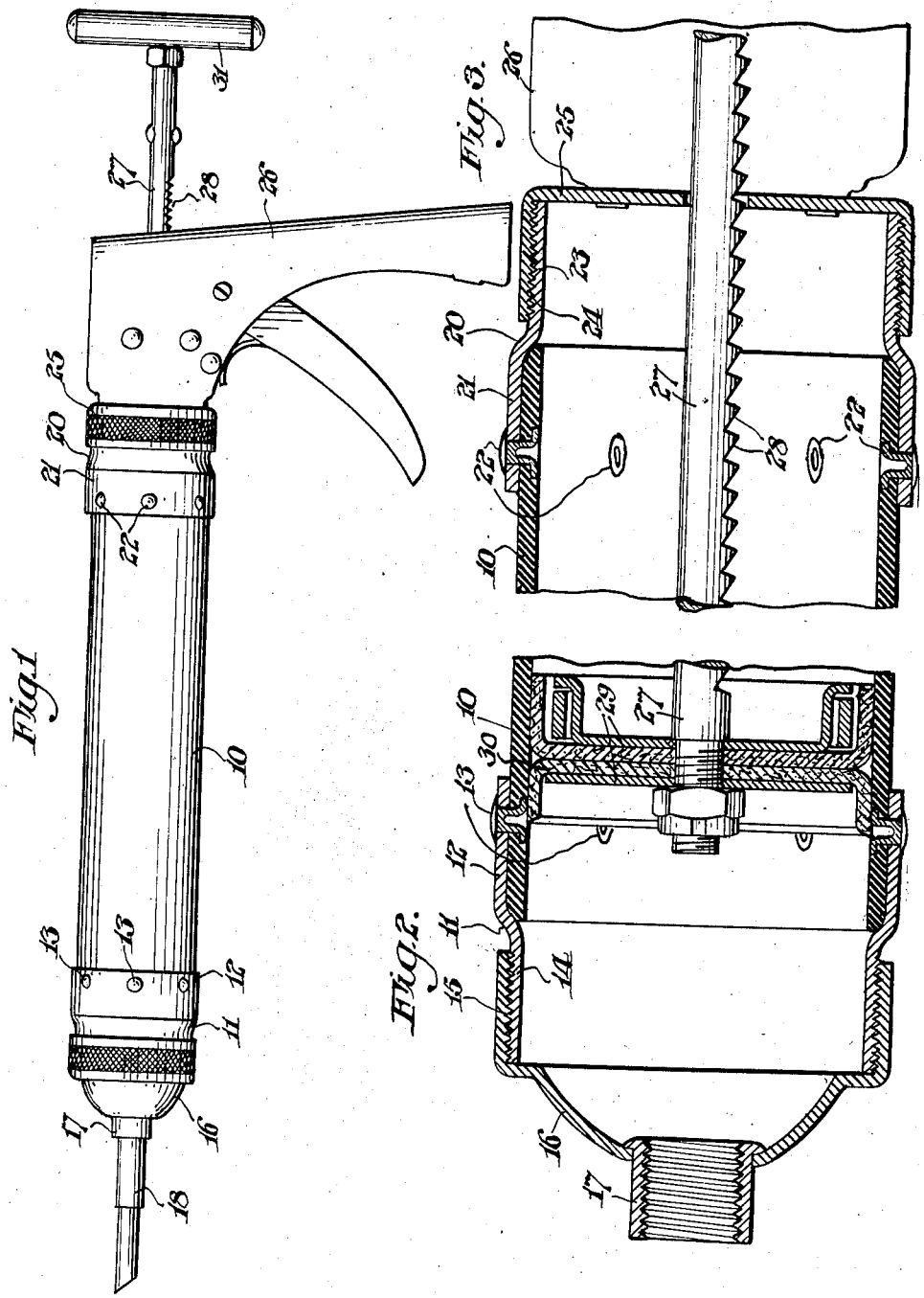

2,340,433

UNITED STATES PATENT OFFICE 2,340,433

PLASTIC MATERIAL DISPENSER

Edward D. Skinner, Philadelphia, Pa., assignor to Kenmar Manufacturing Company, Philadelphia, Pa., a copartnership composed of Robert Calhoun, Jr., and Vincent E. Dewees Application October 15, 1942, Serial No. 462,112

5 Claims. (Cl. 309—2)

This invention relates to plastic material dispensers, that is to say, to apparatus for dispensing and applying plastic or mastic materials, such as caulking compounds, putty, heavy greases, and the like.

In the use of the plastic material dispensers heretofore available difficulty has been encountered because of the tendency of certain materials to adhere to the inside wall of the barrel of the dispenser and to corrode and injure the inside wall unless removed promptly. The removal of the adherent material, after even a short interval of time, was a difficult task. If the inner wall of the barrel was permitted to become corroded or had adherent material thereon, the proper operation of the piston, upon subsequent use, was interfered with and leakage past the piston and damage to the piston packing resulted.

In plastic material dispensers provided with refill cartridges plastic material leaking into contact with the inside of the barrel caused corrosion and also interfered with the removal and reinsertion of the refill cartridges.

The plastic material dispensers heretofore available, particularly when partially or wholly filled with the plastic material to be dispensed, were sufficiently heavy as to cause tiring of the user after a short interval of time.

The principal object of the present invention is to provide an improved plastic material dispenser in which the barrel will be resistant to corrosion.

It is a further object of the present invention to provide a plastic material dispenser which will have a working surface to which the plastic material to be dispensed will be substantially nonadherent.

It is a further object of the present invention to provide a plastic material dispenser which will be light in weight while retaining adequate strength and ruggedness.

Other objects of the invention will be apparent from the annexed specification and claims.

The nature and characteristic features of the invention will be more readily understood from the following description taken in connection with the accompanying drawing forming part hereof, in which Figure 1 is a view in side elevation of a caulking or grease gun embodying the main features of the present invention;

Figure 2 is an enlarged fragmentary longitudinal sectional view of the gun shown in Figure 1, taken at the front or dispensing end; and Fig. 3 is an enlarged fragmentary longitudinal central sectional view of the gun shown in Figure 1, taken at the rear or handle end of the barrel.

It should, of course, be understood that the description and drawing herein are illustrative merely, and that various modifications and changes may be made in the structure disclosed without departing from the spirit of the invention.

Referring to the drawing, the dispenser therein shown includes a hollow barrel or cylinder 10. The barrel proper is preferably made of synthetic plastic material and a synthetic thermosetting plastic of the phenolic resin type, such as Bakelite has been found suitable.

At the dispensing or forward end of the barrel 10 a metallic ferrule or flange member 11 is provided and has a rim 12 overlapping the end of the barrel 10 and secured to the end of the barrel 10 in any suitable manner, such as by rivets 13. The ferrule member 11 also has a forward extension 14 of reduced diameter and externally threaded as at 15, with which a dispensing end cap member 16 is adapted to be engaged. The cap member 16 has an internally threaded forwardly projecting portion 17 with which a dispensing attachment or nozzle 18 is engaged.

The forward end of the barrel 10 and the forward extension 14 of the ferrule member are preferably shaped as aforesaid so that the inner faces of the extension 14 and of the barrel 10 are in alinement and are substantially continuous and smooth.

At the handle or rear end of the barrel 10 a metallic ferrule or member 20 is provided similar to the flange ferrule member 11, the rim 21 thereof overlapping the end of the barrel 10 and being secured to the barrel 10 by rivets 22, and also having a rearward extension 23, likewise of reduced diameter and externally threaded as at 24, being adapted to receive a rear closure cap member 25 to which the handle or stock 26 is secured in any preferred manner.

The handle or stock 26 is preferably made from sheet metal suitably shaped to provide a housing for the actuating parts, which, however, form no essential part of the present invention and may be of any preferred type.

The usual piston rod 27, having teeth 28 if desired, is employed and extends through the cap member 25 and a portion of the handle or stock 26 in which it is guided upon its forward or rearward movement.

The piston rod 27 is provided at its inner end with the usual piston 29 and packing 30 for engagement with the plastic material to be dispensed. The piston rod 27 is provided at its outer end with a handle 31 for the direct manual actuation of the piston rod 27 when desired.

I claim:

1. In a plastic material dispenser provided with a piston, a non-metallic cylinder within which said piston is reciprocable for filling and for pressure discharge of plastic material, metallic ferrule members at the ends of said cylinder, each of said ferrule members having an exterior portion secured to the cylinder and having an extension of reduced diameter there beyond, the interior surfaces of said extensions being alined and continuous with the interior surface of the cylinder, and dispensing and closure cap members respectively mounted on said extensions.

2. In a plastic material dispenser provided with a piston, a non-metallic cylinder within which said piston is reciprocable for filling and for pressure discharge of plastic material, metallic ferrule members on the ends of said cylinder, each of said ferrule members having a portion overlapping the cylinder and secured thereto and having an extension of reduced diameter, the interior surfaces of said extensions being alined and continuous with the interior surface of the cylinder, and dispensing and closure cap members mounted on the exterior surfaces of said extensions beyond the ends of the cylinder.

3. In a plastic material dispenser provided with a piston, a cylinder within which said piston is reciprocable for filling and for forced discharge of plastic material, said cylinder being made of a synthetic resin and having metallic ferrule members secured on the ends thereof, each of said ferrules having an extension of reduced diameter beyond said cylinder, the interior surfaces of said extensions being alined and continuous with the interior surface of the cylinder, and dispensing and closure cap members respectively mounted on said extensions.

4. In a plastic material dispenser provided with a piston, a cylinder body within which said piston is reciprocable for filling and for forced discharge of plastic material, said cylinder body being made of phenolic resin and having metallic ferrule members secured on the ends thereof, each of said ferrules having a portion secured to the cylinder body and an extension of reduced diameter beyond said cylinder body, the interior surfaces of said extensions being alined and continuous with the interior surface of the cylinder body, and dispensing and closure cap members respectively mounted on said extensions.

5. In a plastic material dispenser provided with a piston, a cylinder body within which said piston is reciprocable for filling and for forced discharge of plastic material, said cylinder body being made of a synthetic thermosetting resin and having metallic ferrule members secured on the ends thereof, each of said ferrules having an extension of reduced diameter beyond said cylinder body, the interior surfaces of said extensions being alined and continuous with the interior surface of the cylinder, and the exterior surfaces of said extensions being threaded, and dispensing and closure cap members respectively mounted on the threaded exterior surfaces of said extensions.

EDWARD D. SKINNER.